US009159488B2

(12) United States Patent
Tanimizu et al.

(10) Patent No.: US 9,159,488 B2
(45) Date of Patent: Oct. 13, 2015

(54) VACUUM CAPACITOR-VOLTAGE-TRANSFORMER

(75) Inventors: Toru Tanimizu, Ibaraki (JP); Toru Nishizawa, Novi, MI (US); Toshimasa Fukai, Shizuoka (JP); Kaoru Kitakizaki, Saitama (JP); Takayoshi Tanimura, Tokyo (JP)

(73) Assignees: MEIDENSHA CORPORATION, Tokyo (JP); TC-TANIC, INCORPORATED, Sunto-gun (JP)

( * ) Notice: Subject to any disclaimer, the term of this patent is extended or adjusted under 35 U.S.C. 154(b) by 708 days.

(21) Appl. No.: 13/393,703

(22) PCT Filed: Sep. 1, 2010

(86) PCT No.: PCT/JP2010/064963

§ 371 (c)(1), (2), (4) Date: Mar. 1, 2012

(87) PCT Pub. No.: WO2011/027797

PCT Pub. Date: Mar. 10, 2011

(65) Prior Publication Data

US 2012/0153932 A1 Jun. 21, 2012

(30) Foreign Application Priority Data

Sep. 2, 2009 (JP) ................................ 2009-202969

(51) Int. Cl.

*H02M 3/06* (2006.01)
*H01F 27/42* (2006.01)
*H01F 38/24* (2006.01)

(52) U.S. Cl.

CPC ............. *H01F 27/425* (2013.01); *H01F 38/24* (2013.01)

(58) Field of Classification Search

CPC ........................................................ H02M 3/06
USPC ............................ 307/109; 323/359; 218/144
See application file for complete search history.

(56) References Cited

U.S. PATENT DOCUMENTS 4,239,948 A * 12/1980 Tsukushi et al. ................ 218/43
4,896,008 A * 1/1990 Aoki et al. .................... 218/134

(Continued)

FOREIGN PATENT DOCUMENTS

JP 52-061726 A 5/1977
JP 52061726 A * 5/1977

(Continued)

OTHER PUBLICATIONS

Chinese Office Action and English Language Translation dated Jan. 8, 2014 (14 pages).

(Continued)

*Primary Examiner* — Rexford Barnie
*Assistant Examiner* — Joseph Inge
(74) *Attorney, Agent, or Firm* — Foley & Lardner LLP

(57) ABSTRACT

[Task] The present invention aims to provide a vacuum capacitor instrument voltage transformer by which current and voltage can be much precisely measured.
[Means for achieving task] The means is so made that a main capacitor portion 8 and a voltage dividing capacitor portion 10 are installed in a earthed vacuum vessel, a main ground circuit 30 is provided through which a leak current $I_2$ flows from an outer surface of the primary line-path side vacuum vessel to the earth E, and a voltage dividing ground circuit 31 is provided through which a leak current $I_{11}$ flows to the earth E through a voltage dividing insulating cylindrical member 11 that is disposed between an earthed portion and each of the main capacitor portion and the voltage dividing capacitor portion.

4 Claims, 2 Drawing Sheets

(56) References Cited

U.S. PATENT DOCUMENTS

| | | | | |
|---|---|---|---|---|
| 2010/0172064 | A1 * | 7/2010 | Takahashi | 361/296 |
| 2010/0254066 | A1 | 10/2010 | Takahashi | |

FOREIGN PATENT DOCUMENTS

| | | | | |
|---|---|---|---|---|
| JP | 64-067833 | A | | 3/1989 |
| JP | 10-031037 | A | | 2/1998 |
| JP | 10031037 | A | * | 2/1998 |
| JP | 2001-28321 | A | | 1/2001 |
| WO | WO 2009/066570 | A1 | | 5/2009 |

OTHER PUBLICATIONS

Voltage Transformer—2$^{nd}$ part: Voltage Transformer, JIS C1731-2: 1998, Incorporated Foundation Nippon Kikaku Kyoukai, 1998, p. 1.

Voltage Transformer, JEC-1201-2007, Denki Shoin Co., Ltd., 2007, p. 75 to 76.

* cited by examiner

VACUUM CAPACITOR-VOLTAGE-TRANSFORMER

TECHNICAL FIELD

The present invention relates to a vacuum capacitor instrument voltage transformer that comprises a vacuum capacitor as a main capacitor arranged between a primary line-path side terminal and a voltage dividing point, a vacuum voltage dividing capacitor arranged between the voltage dividing point and a ground side terminal, a capacitor instrument voltage transformer arranged in parallel with the vacuum voltage dividing capacitor and a transforming device that transforms the output from the capacitor instrument voltage transformer into a desired output form.

BACKGROUND ART

In general, according to the Non-Patent Document 1, a capacitor instrument voltage transformer (which will be referred to as CVT in the following) has the following construction.

That is, the CVT is defined as an instrument voltage transformer that employs a capacitor voltage dividing function and constructed to obtain a divided voltage from the CVT by using a main capacitor arranged between a primary line-path side terminal and a voltage dividing point, a voltage dividing capacitor arranged between the voltage dividing point and a ground side terminal and a transformer of the CVT (which will be referred to as CVT transformer in the following) that is directly connected to the voltage dividing capacitor or connected to the voltage dividing capacitor through a resonance reactor.

More specifically, a bushing CVT described in the Non-Patent Document 2 is much general. In the bushing CVT, a capacitance of a capacitor bushing produced by a resin impregnated insulating paper, a solid insulator such as epoxy resin or the like or an insulating oil that is used for the primary line-path side terminal of a transformer is used as a main capacitor. Furthermore, it is described that the bushing CVT has a not-small limitation in a secondary burden and an accuracy grade that bring about possibility of producing the bushing CVT.

PRIOR ART DOCUMENTS

Non-Patent Documents

Non-Patent Document 1: [Voltage Transformer—$2^{nd}$ part: Voltage Transformer] JIS C1731-2: 1998, Incorporated Foundation Nippon Kikaku Kyoukai, 1998, p. 1

Non-Patent Document 2: [Voltage Transformer] JEC-1201-2007, Denki Shoin Co., Ltd., 2007, p. 75 to 76

SUMMARY OF INVENTION

Problems to be Solved by Invention

However, the above-mentioned CVT has the following drawbacks.

1. The dielectric material such as the resin impregnated insulating paper, the solid insulator such as epoxy resin or the like or the insulating oil that forms the capacitance is subjected to changes in dielectric constant when temperature, moisture and/or barometric pressure changes. If the dielectric constant is not stable, the divided voltage of the CVT is unstable, and thus, the accuracy grade of the system as the voltage transformer is lowered and thus accurate protection and measuring are impossible.

2. By putting, between mutually facing electrode surfaces of the primary line-path side and the ground side, a high insulative dielectric material such as the resin impregnated insulating paper, the solid insulator such as epoxy resin or the like or the insulating oil, the capacitance of the main capacitor and that of the voltage dividing capacitor are provided for the CVT. In the CVT, a needed capacitance is obtained by reducing the distance between the two electrode surfaces.

However, reduction of the distance between the two electrode surfaces brings about deterioration in both withstand voltage characteristic and life characteristic. Commercially available CVTs are those that are constructed by taking balance of them into consideration. As a result, the incidence of trouble has increased as the CVT has a higher performance.

3. Furthermore, once the insulating oil and/or the insulating material between the electrodes is subjected to a dielectric breakdown, recovery for insulation is impossible, so that the CVT has such a possibility of losing the function thereof as well as having explosion/burning thereof.

For the reasons as mentioned hereinabove, a measured current provided by a relation between the main capacitor and the voltage dividing capacitor is easily changed, so that it is difficult to obtain a high precision voltage by converting the current by the transforming device.

4. For obtaining a capacitance by using an insulating material as the dielectric material, there has been employed an arrangement in which two electrodes of the primary line-path side and the ground side are arranged to face each other, an insulating material such as epoxy resin is disposed between the two electrodes, and an insulating material such as ceramic or epoxy resin is arranged to cover a unit including the two electrodes and the insulating material to hold the two electrodes and insulate the same. However, a leak micro-current is allowed to flow through an outer surface of the insulating material so long as the insulating material such as the epoxy resin or the like is present between the mutually facing two electrodes. Furthermore, due to moisture/water and soilure applied to the insulating material, it inevitably occurs that a leak micro-current flows through the outer surface of the insulating material that effects the supporting and insulating.

Also in connecting lines through which the divided voltage of the CVT and the current to be measured are fed to the CVT, it occurs that leak micro-current flows.

The current flowing through the main capacitor and the voltage dividing capacitor is also micro-current. If, the CVT that is actuated by such micro-current and the transforming device that transforms the output into the desired output form are applied with the above-mentioned two types of leak current, measuring error is increased due to the leak current. With this reason, the accuracy grade of the instrument voltage transformer is lowered and thus highly accurate protection and measuring are impossible.

Thus, an object of the present invention is to provide a vacuum capacitor instrument voltage transformer that is able to suppress fluctuations of a voltage to be measured, carry out an accurate measurement of the voltage and exhibit a high safety.

Means for Solving the Problems

In a first aspect of the invention, there is provided a system which comprises a main capacitor arranged between a primary line-path side terminal and a voltage dividing point and, a voltage dividing capacitor arranged between the voltage dividing point and a ground side terminal and a transforming device that measures a current provided by a ratio in capacitance between the main capacitor and the voltage dividing capacitor and outputs a corresponding voltage, which is characterized in that at least the insulation of the main capacitor is effected by a vacuum insulation.

In a second aspect of the invention, there is provided a system which comprises a vacuum vessel that includes an earthed insulating tube and electrically conductive end plates that close open ends of the insulating tube in a manner to provide a vacuum condition in the insulating tube and a system that is installed in the vacuum vessel and includes a primary line-path side main capacitor portion, a ground side voltage dividing capacitor portion and a transforming device that measures a current provided by a ratio in capacitance between the main capacitor portion and the voltage dividing capacitor portion and outputs a corresponding voltage, which is characterized by further comprising:

a main ground circuit through which a leak current flows from an outer surface of the primary line-path side vacuum vessel to the earth; and a voltage dividing ground circuit through which a leak current flows to the earth through a voltage dividing insulating cylindrical member that is disposed between an earthed portion and each of the main capacitor portion and the voltage dividing capacitor portion.

In a third aspect of the invention, there is provided a system which is characterized by having a supporting plate having a voltage dividing insulating cylindrical member installed in the vacuum vessel and supported by one of the electrically conductive end plates; a voltage dividing plate through which a measured current flows, the voltage dividing plate being connected to the supporting plate; a container chamber that is hermetically sealed by the supporting plate having the voltage dividing insulating cylindrical member connected thereto, the voltage dividing plate and one of the electrically conductive end plates; and a transforming device arranged in the container chamber and having a primary side conductive member connected to the voltage dividing plate.

In a fourth aspect of the invention, there is provided a system that is defined by the above-mentioned second aspect and further characterized in that the container chamber is equipped with drying means for keeping the container chamber in a dried condition.

In a fifth aspect of the invention, there is provided a system that comprises a transforming device that outputs, as a voltage, a measured current provided by a ratio in capacitance between a primary line-path side main capacitor portion and a ground side voltage dividing capacitor portion, which is characterized in that the main capacitor portion and the voltage dividing capacitor portion are installed an earthed vacuum vessel;

a main ground circuit is provided through which a leak current flows from an outer surface of the primary line-path side vacuum vessel to the earth; and a voltage dividing ground circuit is provided through which a leak current flows to the earth through a voltage dividing insulating cylindrical member that is disposed between an earthed portion and each of the main capacitor portion and the voltage dividing capacitor portion, wherein a resistor member that exhibits a constant resistance even when a temperature changes is used in place of the voltage dividing capacitor portion.

Effects of the Invention

In the vacuum capacitor instrument voltage transformer of the invention, due to the vacuum insulation of the capacitor portions that practically uses the resistance stability of vacuum against temperature, water and atmospheric pressure, the non-explosive property of the vacuum upon an electrical short circuit and the rapid insulation recovery of the vacuum, a stable and safety resistance can be obtained and the divided voltage provided by the CVT is made stable. Thus, the accuracy grade of the instrument voltage transformer is increased and accurate protection and measurement are achieved.

Furthermore, in the vacuum capacitor instrument voltage transformer of the invention, since the interior of the vacuum vessel is not contaminated with dust, leak current can be minimized. Furthermore, by employing the main ground circuit through which a leak current flows from the outer surface of the primary line-path side vacuum vessel to the earth and the voltage dividing ground circuit through which a leak current flows to the earth through the voltage dividing insulating cylindrical member that is disposed between the earthed portion and each of the main capacitor portion and the voltage dividing capacitor portion, the lead current can be reduced by a degree that is induced by the arrangement of the voltage dividing insulating cylindrical member in the vacuum vessel. With these advantages, fluctuation of a divided voltage by the CVT is reduced and thus stable output is obtained. Thus, the measured current provided by a ratio in capacitance between the main capacitor portion and the voltage dividing capacitor portion is made stable and the measured voltage transformed by the transforming device is made stable, so that the measurement can be carried out accurately by a degree that is induced by the removal of the leak current from the measured current and measured voltage.

EMBODIMENTS OF THE INVENTION

Embodiment 1

Figure 1:
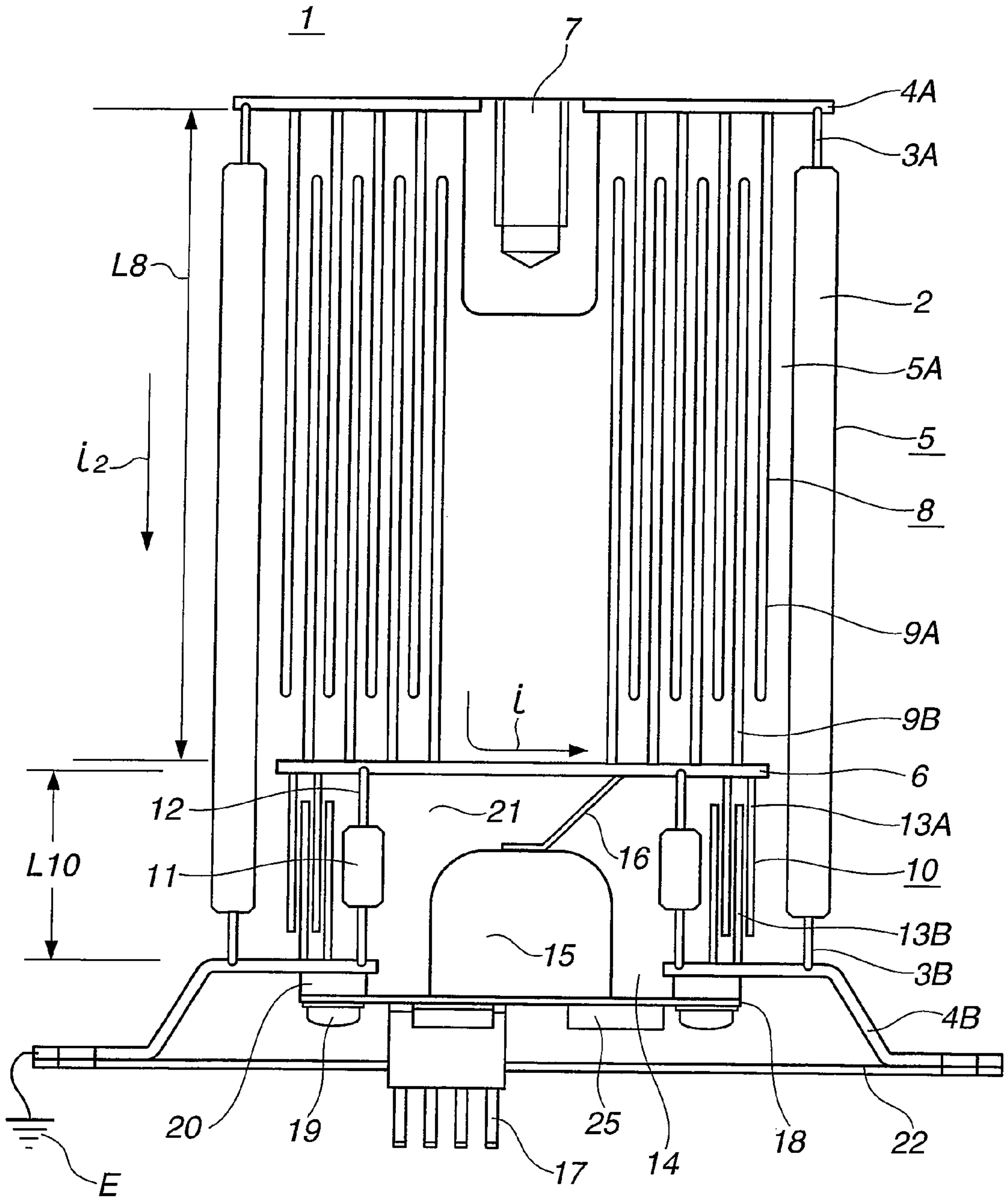
FIG. 1 is a vertically sectioned view provided for explaining a vacuum capacitor instrument voltage transformer which is an embodiment of the invention.

In the following, an embodiment of the present invention will be described with reference to FIG. 1 that shows a vacuum capacitor instrument voltage transformer (which will be referred to as VCVT hereinafter).

An insulating tube 2 is constructed of a tubular ceramic. Opposed open ends of the insulating tube 2 are provided with respective cylindrical portions 3A and 3B. By brazing respective open ends of the cylindrical portions 3A and 3B to a primary line-path side flange 4A and a ground side flange 4B, there is formed a vacuum vessel 5 by which a space defined between both the open ends of the cylindrical portions 3A and 3B and both the primary line-path side flange 4A and the ground side flange 4B is hermetically sealed thereby to permit the interior of the insulating tube 2 to have a vacuumed condition. Each of the primary line-path side flange 4A and the ground side flange 4B is made of an end plate of an electrically conductive material. If desired, the primary line-path side flange 4A and the ground side flange 4B may be directly connected to the insulating tube 2 for producing the vacuum vessel 5.

In a middle portion of the vacuum vessel 5, there is arranged a voltage dividing plate 6. The voltage dividing plate 6 is supported on a cylindrical support plate 12 that is brazed to and supported on a central portion of the ground side flange 4B. The ground side flange 4B is earthed at E. To a central portion of the primary line-path side flange 4A, there is connected a primary terminal 7 that is connected to a high voltage system.

A main capacitor portion 8 is arranged between the primary line-path side flange 4A and the voltage dividing plate 6. The voltage dividing plate 6 is a member through which a current to be measured flows. The main capacitor portion 8 has a plurality of first electrodes 9A that extend toward the primary line-path side flange 4A through a space between the insulating tube 2 and the primary terminal 7. Each first electrode 9A has a portion extending toward the voltage dividing plate 6. The first electrodes 9A are a plurality of cylindrical members concentrically arranged in order of the diameter.

A plurality of second electrodes 9B are arranged to extend toward the primary line-path side flange 4A through spaces defined between the first electrodes 9A and the first electrodes 9A and supported on the voltage dividing plate 6 keeping between each first electrode 9A and the corresponding second electrode 9B an insulating distance that provides the main capacitor portion 8 with a given withstand voltage. Between mutually facing surfaces of each first electrode 9A and corresponding second electrode 9B, there is developed a charge for a capacitance.

It is to be noted that even though the mutually facing first and second electrodes have their minimum number, they are able to serve as a vacuum type main capacitor portion 8.

A voltage dividing capacitor portion 10 is installed between the voltage dividing plate 6 and the ground side flange 4B. The voltage dividing capacitor portion 10 has a voltage dividing insulating cylindrical member 11 arranged between the voltage dividing plate 6 and the ground side flange 4B. The voltage dividing insulating cylindrical member 11 is connected to them through the supporting plate 12. Due to presence of the voltage dividing plate 6, the voltage dividing insulating cylindrical member 11, the supporting plate 12, the ground side flange 4A and the insulating tube 2, there is defined a vacuum chamber 5A. Within the vacuum chamber 5A, there are arranged both the main capacitor portion 8 and the voltage dividing capacitor portion 10.

The voltage dividing capacitor portion 10 comprises a plurality of first voltage dividing electrodes 13A supported by the voltage dividing plate 6 and a plurality of second voltage electrodes 13B connected to the ground side flange 4B. An insulating distance between each first voltage dividing electrode 13A and the corresponding second voltage dividing electrode 13B is determined by a given withstand voltage applied to the voltage dividing capacitor portion 10. Each first voltage dividing electrode 13A and the corresponding second voltage dividing electrode 13B are arranged to face each other in a manner to form a given capacitance therebetween and extend toward the ground side flange 4B and the voltage dividing plate 6 respectively.

The distance between each first electrode 9A and the corresponding second electrode 9B in the main capacitor portion 8 is larger than the distance between first voltage dividing electrode 13A and the corresponding second voltage dividing electrode 13B in the voltage dividing capacitor portion 10, and the voltage dividing capacitance portion 10 has a higher capacitance production efficiency than the main capacitor portion 8. For providing the main capacitor portion 8 with a needed capacitance, an arrangement is so made that the axial length L8 of the portion 8 is longer than the axial length L10 of the voltage dividing capacitor portion 10. If desired, the surface of the main capacitor portion 8 may be larger than that of the voltage dividing capacitor portion 10. That is, the main capacitor portion 8 and the voltage dividing capacitor portion 10 are so set as to have respectively needed capacitance values while satisfying the respective withstand voltages.

By the supporting plate 12 equipped with the voltage dividing insulating cylindrical member 11, the voltage dividing plate 6 and the ground side flange 4B, there is formed a cylindrical container chamber that is hermetically sealed. Into the container chamber, there is fed a dried air, for example, nitrogen gas, carbon dioxide or the like. Or, if desired, a drying agent, for example, a silica gel or the like, may be used. The container chamber 21 is communicated with an open portion 14 provided by the ground side flange 4B. Before setting the transforming device 15 in the container chamber 21, the transforming device 15 is handled to pass through the open portion 14.

A primary side conductive member 16 of the transforming device 15 is connected to the voltage dividing plate 6. As is well known, in an interior of the transforming device 15, there is provided a construction wherein a primary winding connected to the primary side conductive member 16 is wound around an iron core, a secondary winding is wound around the iron core, and a secondary side terminal 17 of the secondary winding is drawn out to the outside. The primary winding and secondary winding are covered with an insulating resin or the like and not shown in the drawings.

The transforming device 15 is supported by an insulating base plate 18 that is provided at the secondary terminal side of the transforming device 15, and the insulating base plate 18 is supported by an annular metal seat 20 through connecting screws 19. The metal seat 20 is supported by the ground side flange 4B through welding. The ground side flange 4B is supported by a chassis 22 of electric parts through a not-shown fastening means. If desired, the container chamber 21 may be used in a vacuum condition.

If the metal seat 20 for supporting the transforming device 15 and the secondary terminal 17 are provided with sealing members (not shown), leakage of the hermetically sealed condition of the container chamber 21 is much effectively suppressed. If desired, for supporting the transforming device 15, the same may be directly fixed to the ground side flange 4B. Designated by numeral 25 is a control portion mounted to the insulating base plate.

Since, in this embodiment, the transforming device 15 arranged in the container chamber 21 is sealed by the supporting plate 12 equipped with the voltage dividing insulating cylindrical member 11, the voltage dividing plate 6 and the ground side flange 4B, a noise attack from the outside is suppressed, and thus, a voltage can be measured accurately by a degree that is induced by the removal of noise.

When the container chamber 21 contains a dried air, for example, nitrogen gas, carbon dioxide or the like or has a silica gel or the like installed therein, a water absorbing ratio of the neighboring voltage dividing insulating cylindrical member 11 is lowered, and thus, the leak current $I_{11}$ is much reduced causing a constant and stable output, and thus, much exact voltage measurement is achieved.

Since the main capacitor portion 8 and the voltage dividing capacitor portion 10 are arranged in the vacuum vessel 5, an outer surface distance of the insulating tube 2 is increased and thus the withstand voltage performance of the outer surface of the insulating tube 2 is increased.

Since the transforming device 15 is installed in the container chamber 21 formed in the voltage dividing insulating cylindrical member 11, it never occurs that the proper part of the transforming device 15 projects to the outside and thus, the VCVT can be reduced in size. It is to be noted that even if the proper part of the transforming device is arranged outside the vacuum vessel, the voltage can be measured.

Measurement of a voltage provided by the VCVT is as follows. When, for example, a high voltage of about 66 KV is applied to the primary terminal 7, the same is divided at the voltage dividing plate 6 to about 1 KV to 10 KV through the main capacitor portion 8, and a measured current $I_1$ from the primary terminal 7 flows to the primary side conductive member 16 through the main capacitor portion 8 and the voltage dividing plate 6, and at the secondary side terminal 17 of the transforming device 15, the current is measured and converted to a lower voltage.

Hitherto, insulation in the vacuum vessel has been made by liquid insulating material or solid insulating material. However, in the embodiment of the invention, such insulation is effected by a vacuum insulation. Accordingly, even when the measurement is applied to a lower voltage caused by the capacitance voltage dividing work, the lower voltage can be stably measured without being influenced by temperature, moisture and atmospheric pressure.

Even though the distance between the electrodes is small, the vacuum condition prevents the deterioration of the withstand voltage characteristic, and thus, the operating life of the VCVT can be elongated from a level of solid insulation that has a short life to a level of a vacuum insulation that has an eternal life. If the vacuum is subjected to a breakdown, the same can recover quickly, and thus, the VCVT can continuously operate without reducing the function thereof. Furthermore, even if the vacuum is subjected to a breakdown, the breakdown does not induce explosion and thus, safety is increased.

Figure 2:
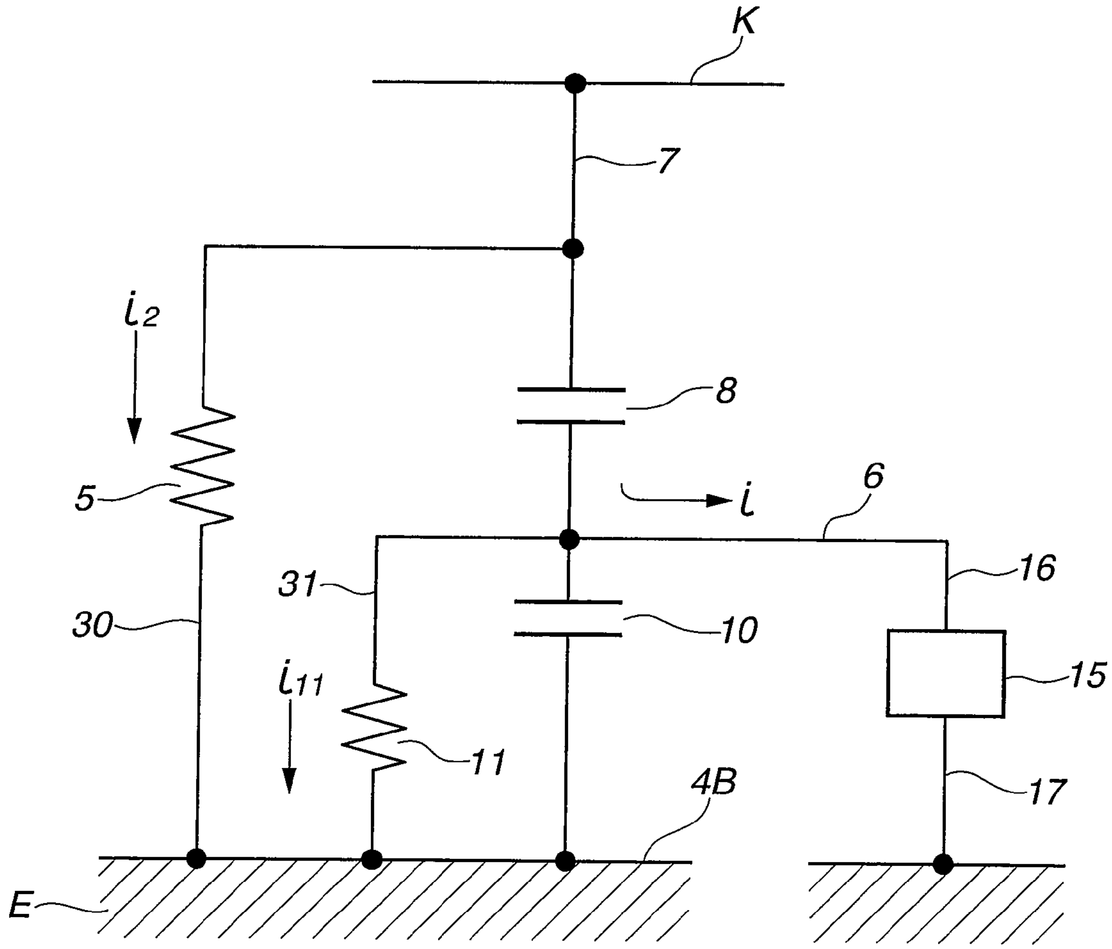
FIG. 2 is an equivalent circuit of the vacuum capacitor instrument voltage transformer of the invention shown in FIG. 1.

Measurement of voltage will be described with the aid of the equivalent circuit of FIG. 2. FIG. 2 is the equivalent circuit of FIG. 1. If, due to long use of the VCVT, an outer surface of the vacuum vessel, which extends from the primary terminal 7 connected to the high voltage system K at the primary line-path side, is contaminated with dust, leak current $I_2$ is forced to flow to the ground E through the outer surface of the vacuum vessel. A so-called main ground circuit 30 is produced. That is, the leak current $I_2$ is permitted to flow from the main ground circuit 30 to the ground E, and thus, as compared with a voltage that has been measured with being influenced by the leak current $I_2$, the voltage can be correctly measured by a degree that is induced by the removal of the leak current $I_2$.

In the embodiment of the invention, for much correctly measuring the voltage, there is also formed a voltage dividing ground circuit 31 through which leak current $I_{11}$ is forced to flow from the voltage dividing plate 6 to the ground E through the voltage dividing insulating cylindrical member 11. The leak current $I_{11}$ is very small. This is because the voltage dividing insulating cylindrical member 11 is installed in the vacuum vessel and thus the cylindrical member 11 is not easily contaminated with dust. When, as is mentioned hereinabove, the container chamber 21 is dried, the leak current $I_{11}$ is reduced and thus, the output is much more stably obtained.

As is described hereinabove, since, in the embodiment of the invention, the measured current $I_1$ and measured voltage can be made stable by a degree that is induced by the removal of the leak current $I_2$ and leak current $I_{11}$, much accurate measurement of voltage is achieved. Furthermore, due to protection against invading noise, the voltage can be measured accurately by a degree that is induced by the removal of the invading noise.

Embodiment 2

In place of the above-mentioned voltage dividing capacitor portion 10, a metal that exhibits a constant resistance even when a temperature changes is used as a resistor member. The resistor member used in place of the above-mentioned voltage dividing capacitor portion 10 comprises first voltage dividing resistor electrodes that are placed at a position corresponding to the position where the above-mentioned first voltage dividing electrodes 13A supported by the voltage dividing plate 6 are placed and second resistor electrodes that are placed at a position corresponding to the position where the above-mentioned second voltage dividing electrodes 13B connected to the ground side flange 4B are placed. The first voltage dividing resistor electrodes and the second resistor electrodes are arranged to face to one another to form a given capacitance therebetween and respectively extend toward the ground side flange and the voltage dividing plate.

Since, in the construction of this second embodiment, the resistor member exhibits a constant resistance even when the temperature changes, the leak current forced to flow in the voltage dividing ground circuit is very small and stable and flows into the ground. Thus, the output voltage can be much constant and much stable.

POSSIBILITY OF INDUSTRIAL USE

As is described hereinabove, in the VCVT of the invention, usage of the vacuum insulation makes the device small in size and long in life, and induces that even if an electrical short circuit takes place, no explosion is assured thereby exhibiting a high safety and a recovery for the insulation is instantly obtained.

Furthermore, in the VCVT of the invention, measurement of the current $I_1$ and that of the voltage are stably carried out, and thus the voltage at the transforming device can be much accurately made.

DESCRIPTION OF REFERENCES

1 . . . VCVT (Vacuum Capacitor Instrument Voltage Transformer), 2 . . . insulating tube, 3A, 3B . . . cylindrical portion, 4A . . . primary line-path side flange, 4B . . . ground side flange, 5 . . . vacuum vessel, 6 . . . voltage dividing plate, 7 . . . primary terminal, 8 . . . main capacitor portion, 9A . . . first electrodes, 9B . . . second electrodes, 10 . . . voltage dividing capacitor portion, 11 . . . voltage dividing insulating cylindrical member, 12 . . . supporting plate, 13A . . . first voltage dividing electrodes, 13B . . . second voltage dividing electrodes, 14 . . . open portion, 15 . . . transforming device, 16 . . . primary side conductive member, 17 . . . secondary side terminal, 18 . . . insulating base plate, 19 . . . connecting screws, 20 . . . metal seat, 21 . . . container chamber, 30 . . . main ground circuit, 31 . . . voltage dividing ground circuit.

The invention claimed is:

1. A vacuum capacitor instrument voltage transformer comprising:

a vacuum vessel comprising a grounded insulating tube and electrically conductive end plates that close open ends of the insulating tube in a manner to provide a vacuum condition in the insulating tube; and a system that is installed in the vacuum vessel and comprises:

a primary line-path side main capacitor portion;

a ground side voltage dividing capacitor portion;

a transforming device that measures a current provided by a ratio in capacitance between the main capacitor portion and the voltage dividing capacitor portion and outputs a corresponding voltage;

a main ground circuit through which a leak current flows from an outer surface of the primary line-path side vacuum vessel to ground; and a voltage dividing ground circuit through which a leak current flows to ground through a voltage dividing insulating cylindrical member that is disposed between a grounded portion and each of the main capacitor portion and the voltage dividing capacitor portion.

2. A vacuum capacitor instrument voltage transformer comprising:

a vacuum vessel comprising a grounded insulating tube and electrically conductive end plates that dose open ends of the insulating tube in a manner to provide a vacuum condition in the insulating tube; and a system that is installed in the vacuum vessel and comprises:

a primary line-path side main capacitor portion;

a ground side voltage dividing capacitor portion;

a transforming device that measures a current provided by a ratio in capacitance between the main capacitor portion and the voltage dividing capacitor portion and outputs a corresponding voltage;

a supporting plate having a voltage dividing insulating cylindrical member installed in the vacuum vessel and supported by one of the electrically conductive end plates;

a voltage dividing plate through which a current to be measured flows, the voltage dividing plate being connected to the supporting plate;

a container chamber that is hermetically sealed by the supporting plate having the voltage dividing insulating cylindrical member connected thereto, the voltage dividing plate and one of the electrically conductive end plates; and a transforming device arranged in the container chamber and having a primary side conductive member connected to the voltage dividing plate.

3. A vacuum capacitor instrument voltage transformer as claimed in claim 2, wherein the container chamber is equipped with drying means for keeping the container chamber in a dried condition.

4. A vacuum capacitor instrument voltage transformer comprising:

a vacuum vessel comprising a grounded insulating tube and electrically conductive end plates that close open ends of the insulating tube in a manner to provide a vacuum condition in the insulating tube;

a transforming device that is installed in the vacuum vessel to measure a current provided by a ratio in capacitance between a primary line-path side main capacitor portion and a ground side resistor member and outputs a corresponding voltage, a main ground circuit through which a leak current flows from an outer surface of the primary line-path side vacuum vessel to ground; and a voltage dividing ground circuit through which a leak current flows to ground through a voltage dividing insulating cylindrical member that is disposed between a grounded portion and each of the main capacitor portion and the resistor member, wherein the resistor member exhibits a constant resistance even when a temperature changes.

* * * * *